United States Patent [19]
Houston

[11] 3,786,852

[45] Jan. 22, 1974

[54] TIRE CHANGER APPARATUS

[75] Inventor: Robert W. Houston, Cincinnati, Ohio

[73] Assignee: Applied Power Industries, Inc., Milwaukee, Wis.

[22] Filed: Apr. 22, 1971

[21] Appl. No.: 136,343

[52] U.S. Cl. ............................................. 157/1.1
[51] Int. Cl. ...................................... B60c 25/06
[58] Field of Search .......................... 157/1.1, 1.24

[56] References Cited
UNITED STATES PATENTS

| | | | |
|---|---|---|---|
| 3,552,469 | 1/1971 | Corless | 157/1.1 |
| 2,900,015 | 8/1959 | Harrison | 157/1.1 |
| 2,910,117 | 10/1959 | Lamerson | 157/1.1 |
| 2,936,827 | 5/1960 | Riggs | 157/1.1 |
| 3,461,938 | 8/1969 | Mueller | 157/1.1 |
| 3,675,705 | 7/1972 | Corless | 157/1.1 |

*Primary Examiner*—Granville Y. Custer, Jr.
*Attorney, Agent, or Firm*—Petherbridge, O'Neil & Lindgren

[57] ABSTRACT

A tire changer including a seat expander for sealing beads of a tubeless tire onto a wheel. The wheel and unmounted tire are supported on a support table having a series of holes communicating with manifold chamber constructed in a segment of the support table. The chamber is selectively coupled to a source of high pressure air to cause the air to be directed into the peripheral cavity of the wheel around the outer rim for deflection into the tire cavity. The air pressure induced in the tire cavity causes flexing of the side walls of the tire to seat the beads thereof in the seating area of the wheel. The application of pressure into the tire is controlled by a foot pedal which is operatively connected to a valve imposed between the air source and the manifold chamber.

12 Claims, 6 Drawing Figures

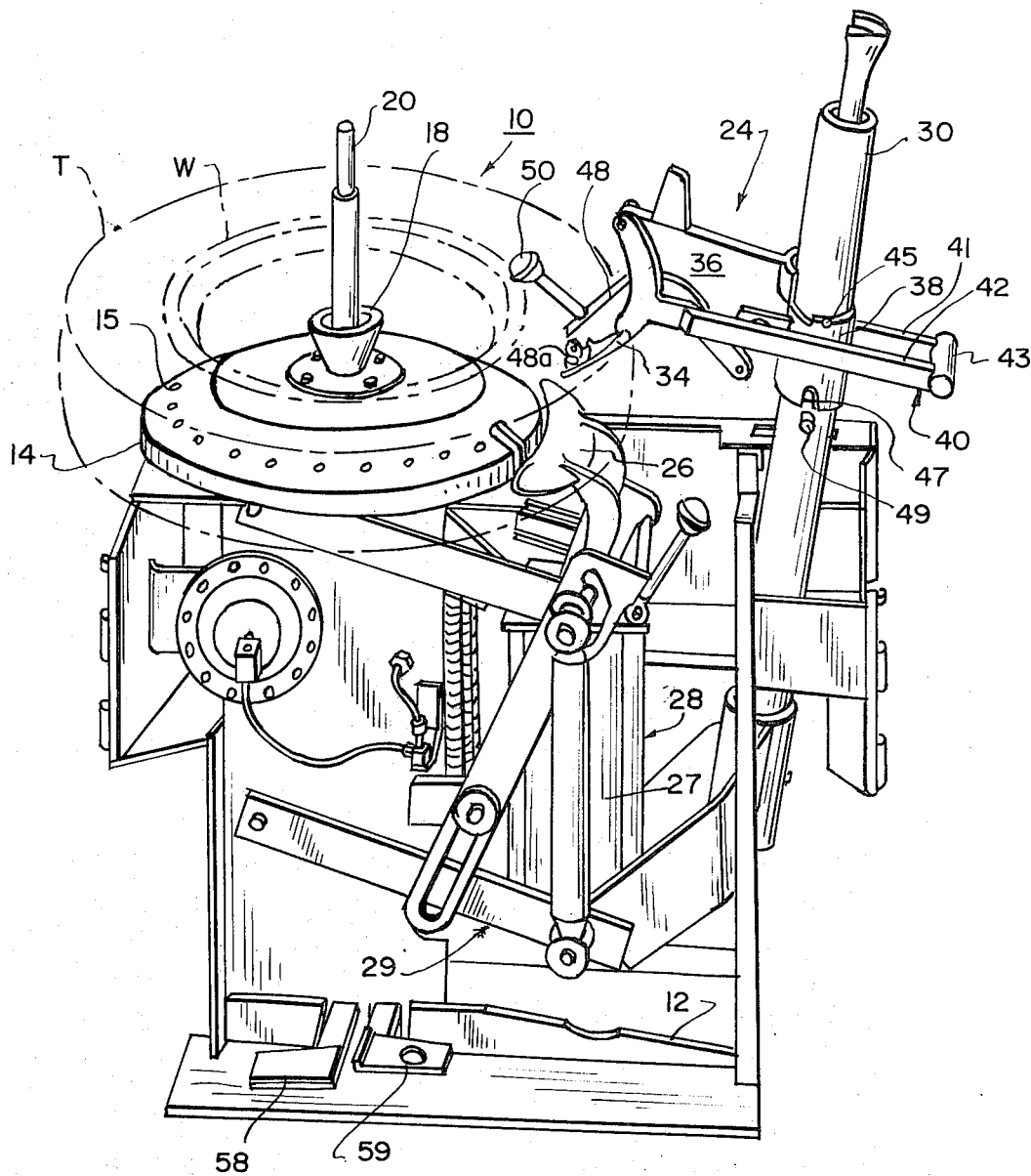

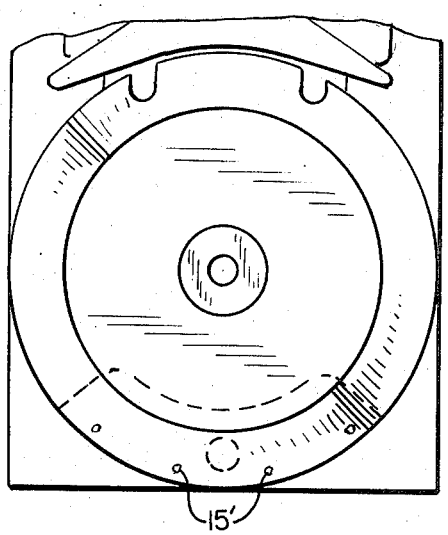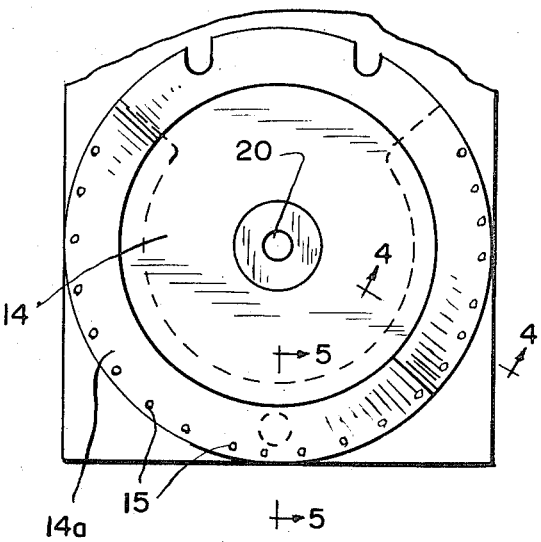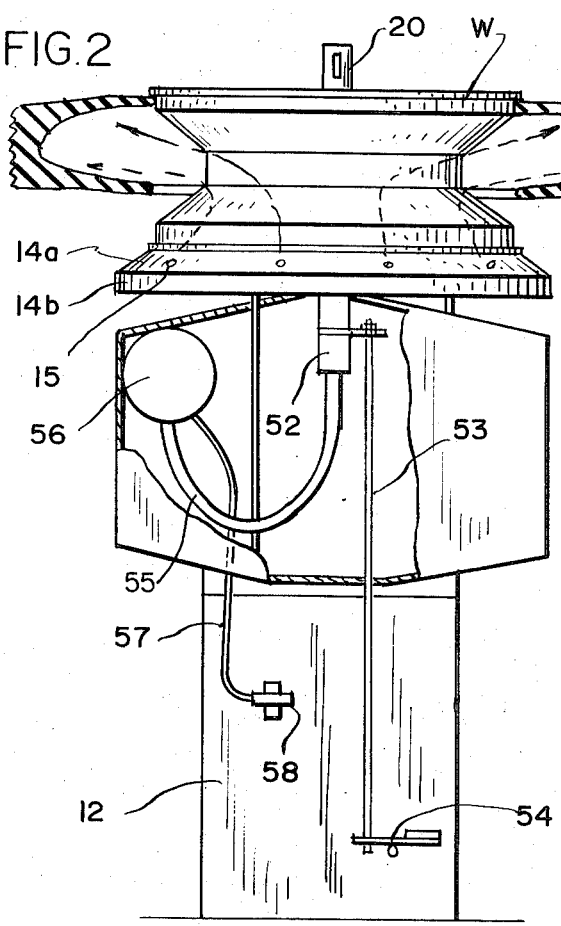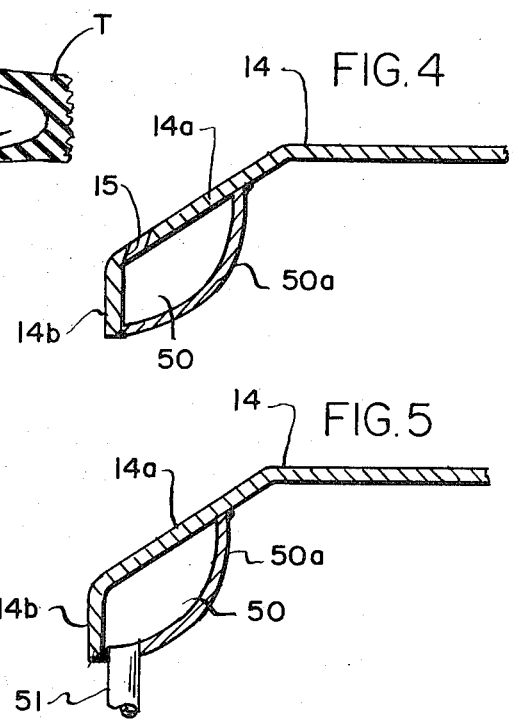

TIRE CHANGER APPARATUS

BACKGROUND OF THE INVENTION

This invention relates in general to a tire changer and in particular to a tire changer having a novel tire bead seating method and apparatus.

More specifically, the invention relates to a tire changing method and apparatus having a novel bead seating device for effectively seating the bead of a tubeless tire onto a wheel. The seating of the tire bead is accomplished by the invention by directing high pressure air into the cavity of the rim for deflection into the tire cavity for flexing at least one tire sidewall into a seating relationship with the wheel.

In recent years the tubeless tire has substantially replaced the older tube type tire. Because of the peculiar design of a tubeless tire, difficulties have been encountered in effectively and easily seating the beads of the tire on a wheel. The basic problem of seating tubeless tires is basically caused by its design whereby the inner tube member present in tube type tires which provided a member while placing air into the tire is eliminated. In tubeless tires, the bead of the sidewall forms the seal between the tire and wheel and thus it must be substantially seated to permit proper mounting of the tire.

Generally, a wheel includes a bead receiving area that engages the respective beads mounted at the inner periphery of the sidewalls of a tubeless tire in a sealing relationship upon sufficient pressure being present within the tire cavity. A primary problem associated with tubeless tires has been the achievement of a suitable sealing between the bead and the wheel to permit a necessary pressure to be introduced into the tire cavity to provide suitable seating.

One common technique of sealing a tubeless tire on a rim has been through the utilization of a strap of material which surrounds the tread of the tire in order to force the beads to spread and sealingly engage the rim. Such a technique has been deficient since many tires have a relatively flexible sidewall and are not effectively spread in a manner to seal the air pressure introduced into the tire. To overcome the problem of seating a tire bead, many various other techniques have been attempted to insure that the air pressure within the tire adequately achieves seating of the bead. These techniques have utilized the use of sealing chambers, sealing members and other structures to temporarily seal the pressure within the chamber until the tire has substantially seated in its proper position on the wheel. However, these sealing-type techniques have been ineffective as well as cumbersome and relatively slow in achieving the proper seating desired of a tubeless tire.

One type of known tire mounting device has utilized air directing means to seal a tire on a wheel and uses a continuous circle of air around the wheel. This type of system is undesirable in a tire changer apparatus since the other elements thereof can disturb or block the flow into the tire cavity from the air directing means and thus hinders the tire mounting operation. Therefore, it is desirable to provide an effective tire changing apparatus which includes a tire bead seating means which achieves seating of a tubeless tire to a wheel in an efficient operation.

SUMMARY OF THE INVENTION

It is, therefore, an object of this invention to improve the method and apparatus for changing tires and the like.

Another object of this invention is to improve the method and apparatus for mounting a tubeless tire to a wheel.

Another object of this invention is to reduce the time and effort required for mounting a tubeless tire to a wheel.

A still further object of this invention is to effectively incorporate an improved tubeless tire bead expander in a tire changing apparatus.

These and other objects are attained in accordance with the present invention wherein there is provided a tire changing apparatus which includes an improved tubeless tire bead expander for mounting tubeless tires on a wheel. The improved tire changer includes a support table wherein a segment of the table spaced outwardly from the periphery of the wheel includes a plurality of angularly disposed holes which are adapted to direct a blast of air pressure into the rim cavity. The air pressure then travels around the outer diameter of the rim and is deflected into the tire cavity. The rapid introduction of air into the interior of the tire flexes the sidewalls to effect substantial seating of the bead into the seat area of the rim. The blast of air is introduced through a manifold chamber formed beneath the holes in the table and which is connected to a reservoir. A valve operable by a foot pedal is imposed between the manifold chamber and the air reservoir to selectively introduce air pressure to the tire.

Air introduced into the tire is of adequate pressure to seal the tire to the rim and thereafter the tire may be inflated by conventional means to a desired operating pressure. Thus, the operation of the tire mounting device of the invention permits the bead of a tire to be rapidly and easily positioned on the wheel wherein the previously mentioned prior art problems are alleviated.

The plurality of the orifice means provided in the support table only extend for a circumferential segment around the periphery of a wheel whereby the tubeless tire mounting feature of the invention can be effectively incorporated into the tire changer of the invention. The bead breaking mechanism and other elements of the tire changer is positionable adjacent the table in the segment thereof where orifices are not present. Therefore, the invention includes a novel tire mounting feature incorporated in the tire changing apparatus in a manner to cooperate with the other mechanisms included therein.

DESCRIPTION OF THE DRAWINGS

Further objects of this invention, together with additional features contributing thereto and advantages accuring therefrom will be apparent from the following description of several embodiments of the invention when read in conjunction with the accompanying drawings, wherein:

FIG. 1 is a perspective illustration of one embodiment of the tire changing apparatus of the invention;

FIG. 2 is an end schematic illustration with parts broken away of the tire changer apparatus of FIG. 1;

FIG. 3 is a top schematic illustration of the tire changer illustrated in FIG. 1;

FIG. 4 is a sectional illustration showing the manifold chamber taken along line 4—4 of FIG. 3;

FIG. 5 is a sectional illustration taken along line 5—5 of FIG. 3 showing the valve connection to the manifold chamber;

FIG. 6 is a schematic top illustration of another embodiment of the tire changer of the invention.

DESCRIPTION OF THE PREFERRED EMBODIMENT

Referring now to FIG. 1, there is illustrated an embodiment of the tire changer of the present invention which includes a novel tire beading device for mounting a tubeless tire on a wheel. Tire changer 10 includes a frame 12 which supports the various components of the tire changer. A table member 14 in the form of a truncated cone is attached to the top of frame 12 to support a tire and wheel for tire changing operations. The tire "T" and the wheel "W" are indicated by dotted lines in FIG. 1. A series of holes 15 angularly extend through table 14 and are positioned on a common radius from the center of table for an angular segment thereof (to be described in greater detail later).

A hold-down cone 18 is utilized to retain a wheel and tire placed on the frame and is adapted to be threadedly secured upon a drive shaft 20 which is suitably driven from a drive mechanism within frame 12. The cone 18 engages within the central opening in a wheel W carrying a tire T and is adapted to accommodate wheels of various conventional sizes.

Seat breaker mechanisms for breaking the bond between the bead on the tire sidewalls and the flanges of the rim of the wheel are provided adjacent the table 14 at a position to break both the upper and lower beads. The bead breaker mechanisms comprise a power means 28 operatively connected to an upper bead breaker 24 and a lower bead breaker 26 wherein the drive means moves the two bead breakers with respect to each other to simultaneously break the upper and lower beads of a tire to be removed from the wheeel secured to table 14. The power means 28 comprises a power cylinder 27 operatively connected by a linkage 29 to upper and lower bead breakers 24 and 26. The upper bead breaker 24 includes a blade 34 which is adapted to engage between the upper rim of the wheel and the top of the bead of the tire for separation of the bead from the rim of the wheel. The blade 34 is pivotally carried on a lock plate 36 which is pivotally carried by a pivot tube 38 positioned on the power column 30 in a sliding relationship thereto. A friction lock shoe (not shown) secured to lock plate 36 is utilized to selectively secure the elements against relative movement for tire changing operations. For greater details of the operation of lock plate 36 and the lock shoe, reference is made to U.S. Pat. No. 3,511,296 issued to Houston et al.

A handle 40 is attached at one end to blade 34 and includes links 41 and 42 which are disposed in a general parallel relationship to extend to a rear side of pivot tube 38. Links 41 and 42 are coupled together at the end remote from the brake blade by a conventional hand grip 43. Secured to the pivot tube 38 are a pair of spaced apart stops 45 and 47 against which the links 41 and 42 of the handle engage during use. The bead breaker mechanism also includes a hook stop 48 pivotally mounted at its rear on lock plate 36. A handle 50 extends from hook stop 48 to permit actuation thereof with respect to lock plate 36. To engage the top surface of the rim during normal operation, a swivel pad 48a is pivotally attached to the hook stop 48.

A pair of foot pedals 58 and 59 extend outwardly adjacent the bottom of frame 12 for actuation by a machine operator. Drive shaft 20 is actuated by operation of pedal 58 and breakers 24 and 26 are actuated by the operation of pedal 59 for breaking the bead and for separating the bead breaker mechanism 24 and 26 apart. Again for a greater description of the operation of the tire changer of FIG. 1, the breaking operation thereof and associated elements, reference is made to the aforementioned Houston et al patent.

Referring now to FIGS. 2 and 5, there is illustrated the improved tubeless tire mounting feature of the tire changer of the present invention. The tire mounting device incorporated in the tire changer of the invention is utilized to mount a tire on a wheel so that the beads of the sidewalls of the tire are seated in the proper areas of the wheel or rim.

The tubeless tire is mountable on the tire changer of the invention either on the wheel which has gone through the previously described bead breaking operation or a new rim may be secured by utilization of hold-down cone 18. To replace or mount a tire on the rim or wheel mounted in proper position on the tire changer table 14, the sidewalls of the tire adjacent the beads are lubricated. The tire T is then positioned over the wheel W and a de-mount tool (not shown) is positioned on the tire over the flange of the wheel. The de-mount tool is then re-positioned so as to force the upper sidewall of the tire over the upper flange of the wheel so that the beads of the tire may be expanded into position and engagement with flanges of the tire. At this point in the operation of mounting a tire, the wheel and tire relationship is illustrated in FIG. 1 wherein the bead of one upper sidewall of the tire is substantially in position in the proper flange of the rim at the upper side thereof.

Referring to FIGS. 3 and 4, air holes 15 in table 14 are most clearly illustrated. As shown in FIG. 3, the air holes or orifices utilized in the embodiment described with reference to FIGS. 2 to 5 extend through sloped surface 14a of table 14 for an angular segment of the table of greater than 180°. The number of air-directing holes 15 provided on the table depends on desired inflation results and any number may be selected such as 18 holes as shown in FIG. 3. As illustrated in FIG. 4, each of the holes extend through the slanted portion 14a of table 14 and extend at an angle to vertical so that the longitudinal axis of the holes is directed inwardly toward the wheel. The holes may be directed at any suitable angle with respect to the vertical axis such as, for example, approximately 25°.

A manifold chamber 50 is formed beneath table 14 in fluid communication with air holes 15 and is defined by changer wall 50a and a selected portion of the top of table 14 and a vertical sidewall 14b thereof as most clearly shown in FIG. 4. Manifold chamber 50 extends around the periphery of the table for a distance sufficient to be in fluid communication with all the air holes 15 provided in table top 14. Air pressure is selectively induced into air manifold chamber 50 through air inlet 51. Air inlet 51 is coupled to a conventional valve 52 which is attached in fluid communication with air inlet 51 as illustrated in FIGS. 2 and 5. Valve 52 may be of any conventional design and it is operated by use of a linkage 53 which is connected to a valve foot pedal 54 mounted along the side of frame 12. The foot pedal 54 is mounted above ground level in order to prevent undesired actuation of the foot pedal by an operator.

An air pressure line 55 connects valve 52 to a reservoir tank 56 mounted within the frame 12 of the tire changer. Reservoir tank 56 comprises any conventional reservoir tank which will retain a sufficient level of air pressure for effecting the desired flexing of the tire wall in for seating. To introduce the necessary pressure to the reservoir tank, a feed line 57 is coupled to an air inlet 58 which permits any source of air pressure (not shown) to introduce air pressure into air inlet 58 to maintain reservoir tank 56 at a desired pressure level.

The operator of the tire changer, having positioned a tire as shown in FIG. 2 with the upper bead thereof in substantial seating on the wheel, actuates the valve foot pedal 54 to open valve 52 and induce air pressure from reservoir tank 56 through fluid line 55 into manifold chamber 50. The quantity of air pressure introduced into manifold chamber 50 then exits upwardly through the plurality of holes 15 to enter into the wheel tire periphery. The inward moving air pressure travels around the outer diameter of the wheel W and deflects into the cavity of the tire T. The introduction of air pressure into the tire cavity causes a flexing of the lower sidewall to force the bead thereof to assume a substantial seating relationship with the rim. Therefore, the bead of the tire is quickly and easily seated and sealed into proper position on the flange of the wheel by the tire changer of the invention. Any desired pressure may be introduced into the tire and is generally a pressure necessary to effect a substantial sealing of the bead. After the tire wall is flexed and the lower bead is in position on the wheel, a conventional air hose (not shown) which may be incorporated in the tire changer of FIG. 1 is utilized to fully inflate the tire to a desired operating pressure. It is desirable that the pressure introduced into the tubeless tire for flexing the sidewall and for finally inflating the tire be within the normal inflation limits suggested by the particular tire manufacturers.

Referring now to FIG. 6, there is shown another embodiment of the tire bead seating feature of the present invention. The tire bead seating device shown in FIG. 6 is idential to that shown in the preceding embodiments with the exception that the angular segment of holes provided in the table top is substantially reduced. The air holes 15' angularly extend for an arc of substantially less than 180° and a fewer number of holes are utilized for mounting tubeless tires under certain circumstances. Although four holes are shown in the embodiment of FIG. 6, it should be apparent to those skilled in the art that more than four air holes may be used if desired. The operation of the embodiment of FIG. 6 is otherwise identical to the operation described with reference to the embodiment of FIGS. 2 to 5.

For convenience of illustration, the tubeless tire mounting apparatus and method of the invention has been described for use with the tire changer shown in FIG. 1. However, it is within the scope of the invention to incorporate such a technique of mounting a tubeless tire on a wheel in any suitable tire changing apparatus.

While the invention has been described with reference to preferred embodiments, it will be understood by those skilled in the art that various changes may be made and equivalents may be substituted for the elements thereof without departing from the true spirit and scope of the invention. In addition, many modifications may be made to adapt a particular situation or material to the teaching of the invention without departing from its essential teaching.

What is claimed is:

1. In a tire changer for mounting and dismounting tires from a wheel comprising
   a wheel support means having an upper surface for supporting a tire and a wheel,
   said support means including wheel positioning means for positioning a wheel thereon,
   wheel retaining means arranged to co-operate with the support and positioning means to maintain the wheel position on the support means,
   said upper surface of the support means including a plurality of air pressure directing holes lying on a common radius determined by the positioning means greater than the radius of the rim supporting portion of a wheel,
   each of the plurality of holes having a longitudinal axis sloped generally inwardly at a predetermined angle with respect to the positioning means,
   said support means including an integral manifold chamber positioned beneath the plurality of holes to provide an air chamber integral with the support means and beneath the upper surface thereof,
   a source of air pressure coupled to said manifold for selectively applying air pressure through said sloped holes against said wheel for air deflection into the tire for mounting the tire on the wheel in tire bead seating relationship.

2. In a tire changer for mounting and dismounting tires from a wheel comprising
   a support means having an upper surface for supporting a tire and a wheel,
   said support means including a vertical shaft for positioning a wheel thereon,
   said upper surface including a plurality of air pressure directing holes lying on a common radius from the vertical shaft greater than the radius of a wheel,
   the plurality of holes having a longitudinal axis sloped inwardly at a predetermined angle with respect to the vertical shaft,
   a source of air pressure coupled to said holes for selectively applying air pressure against said wheel for deflection into the tire for mounting the tire on the wheel in a seating relationship,
   said support means includes a manifold chamber positioned beneath the plurality of holes and coupled to the source of air pressure, and said upper surface possesses a truncated cone configuration.

3. The tire changer of claim 2 wherein the plurality of holes are positioned on the sloped surface of the truncated cone.

4. An apparatus for seating the beads of a tubeless tire onto a wheel having bead receiving elements and a tire cavity periphery comprising,
   support means having a surface for supporting a tire and a wheel,
   air pressure transmitting means including orifice means extending through said surface and defining an arc circumscribing a portion of the periphery of the wheel,
   the orifice means including a longitudinal axis which is sloped inwardly toward the periphery of the wheel, a source of air pressure coupled to said air pressure transmitting means to selectively direct air pressure from the orifice means thereof between the tire sidewall and wheel for deflection by the wheel into the cavity to cause flexing of the tire sidewall and seating of an unseated tire bead on a bead receiving element of the wheel, and said source of pressure including a manifold chamber mounted beneath the support means in fluid communication with the orifice means, the orifice means includes a plurality of holes extending through said support means in a surrounding relationship to a portion of the periphery of a wheel supported thereon, the support means includes a first surface for supporting the wheel and tire and a second surface through which the plurality of holes pass, and said first surface and said second surface form an upper surface having a truncated shape.

5. The apparatus of claim 4 wherein said plurality of holes are positioned on a common radius on a sloped portion of the surface.

6. The apparatus of claim 5 wherein said plurality of holes are positioned around the table for a range of more than 180° and less than 360°.

7. The apparatus of claim 5 wherein said plurality of holes are positioned around the table for an extent of less than 180°.

8. The apparatus of claim 1 wherein said source of air pressure includes an air reservoir and a selectively actuable valve means positioned between the air reservoir and the manifold chamber.

9. The apparatus of claim 8 wherein said valve means includes foot operated actuating means.

10. A method of seating the beads of a tubeless tire on a wheel comprising the steps of positioning a wheel and an unseated tubeless tire on a table, directing from a manifold chamber beneath the table through the orifice means a supply of air pressure against a portion of the periphery of the wheel to fill the entire cavity of the wheel, and deflecting the supply of air pressure of the wheel into the cavity of the tubeless tire to flex the sidewall thereof to cause seating of the tire bead onto the wheel.

11. The method of claim 10 wherein the air pressure is directed through a plurality of holes.

12. In a tire changer for mounting and dismounting tires from a wheel comprising a support means having an upper surface for supporting a tire and a wheel, said support means including a vertical shaft for positioning a wheel thereon, said upper surface including a plurality of air pressure directing holes lying on a common radius from the vertical shaft greater than the radius of a wheel, the plurality of holes having a longitudinal axis sloped inwardly at a predetermined angle with respect to the vertical shaft, a source of air pressure coupled to said holes for selectively applying air pressure against said wheel for deflection into the tire for mounting the tire on the wheel in a seating relationship, said upper surface possesses a truncated cone configuration, and said plurality of holes are positioned on the sloped surface of the truncated cone.

* * * * *

Notice of Adverse Decision in Interference

In Interference No. 99,010, involving Patent No. 3,786,852, R. W. Houston, TIRE CHANGER APPARATUS, final judgment adverse to the patentee was rendered Sept. 3, 1976, as to claims 1 and 10.

[*Official Gazette February 1, 1977.*]